United States Patent
Teetzel et al.

(10) Patent No.: US 8,531,592 B2
(45) Date of Patent: Sep. 10, 2013

(54) HEAD-MOUNTED VIDEO RECORDING SYSTEM

(75) Inventors: James W. Teetzel, York, ME (US); Gary M. Lemire, Lee, NH (US)

(73) Assignee: Wilcox Industries Corp., Newington, NH (US)

( * ) Notice: Subject to any disclaimer, the term of this patent is extended or adjusted under 35 U.S.C. 154(b) by 1552 days.

(21) Appl. No.: 11/972,040

(22) Filed: Jan. 10, 2008

(65) Prior Publication Data

US 2008/0170838 A1    Jul. 17, 2008

Related U.S. Application Data

(60) Provisional application No. 60/879,923, filed on Jan. 11, 2007.

(51) Int. Cl.
*H04N 5/225* (2006.01)
*G09G 5/00* (2006.01)

(52) U.S. Cl.
USPC ............... 348/373; 348/375; 348/376; 345/7; 345/8

(58) Field of Classification Search
None
See application file for complete search history.

(56) References Cited

U.S. PATENT DOCUMENTS

| | | | |
|---|---|---|---|
| 6,456,261 B1 * | 9/2002 | Zhang | 345/8 |
| 6,849,849 B1 * | 2/2005 | Warner et al. | 250/330 |
| 7,219,370 B1 * | 5/2007 | Teetzel et al. | 2/6.2 |
| 7,570,301 B2 * | 8/2009 | Gilor | 348/373 |
| 2002/0120979 A1 * | 9/2002 | Prendergast | 2/422 |
| 2003/0058544 A1 * | 3/2003 | Bianco et al. | 359/630 |
| 2003/0122958 A1 * | 7/2003 | Olita et al. | 348/373 |
| 2006/0291849 A1 * | 12/2006 | Shamir et al. | 396/334 |
| 2007/0035707 A1 * | 2/2007 | Margulis | 353/122 |
| 2007/0084985 A1 * | 4/2007 | Smith et al. | 250/207 |
| 2007/0214551 A1 * | 9/2007 | Teetzel et al. | 2/422 |
| 2008/0136960 A1 * | 6/2008 | Kawakami | 348/371 |
| 2009/0109286 A1 * | 4/2009 | Ennis | 348/81 |
| 2009/0109292 A1 * | 4/2009 | Ennis | 348/158 |
| 2010/0001927 A1 * | 1/2010 | Hough et al. | 345/8 |

* cited by examiner

*Primary Examiner* — Lin Ye
*Assistant Examiner* — John H Morehead, III
(74) *Attorney, Agent, or Firm* — McLane, Graf, Raulerson & Middleton, Professional Association

(57) ABSTRACT

A helmet- or head-mounted video recording system is provided for mounting on a piece of head gear such as a head-protective helmet. The system includes a camera module attachable to the head gear, including a first video camera integrated into the camera module for generating a video signal. A recording module is removably attachable to the head gear and is adapted to receive the video signal and store data representative of the video signal. A power supply module is removably attachable to the head gear and is electrically connectable to the camera module and the recording module.

4 Claims, 10 Drawing Sheets

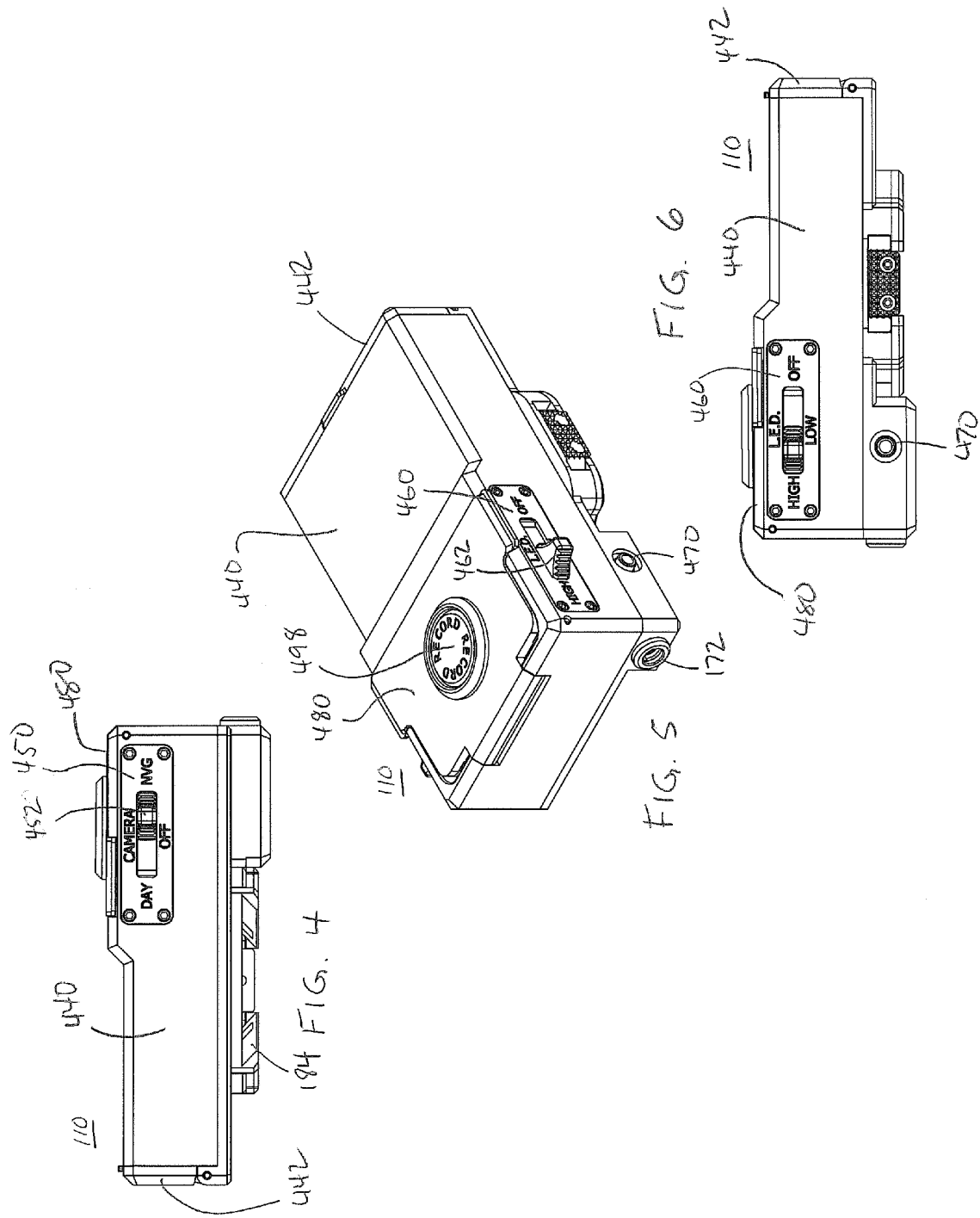

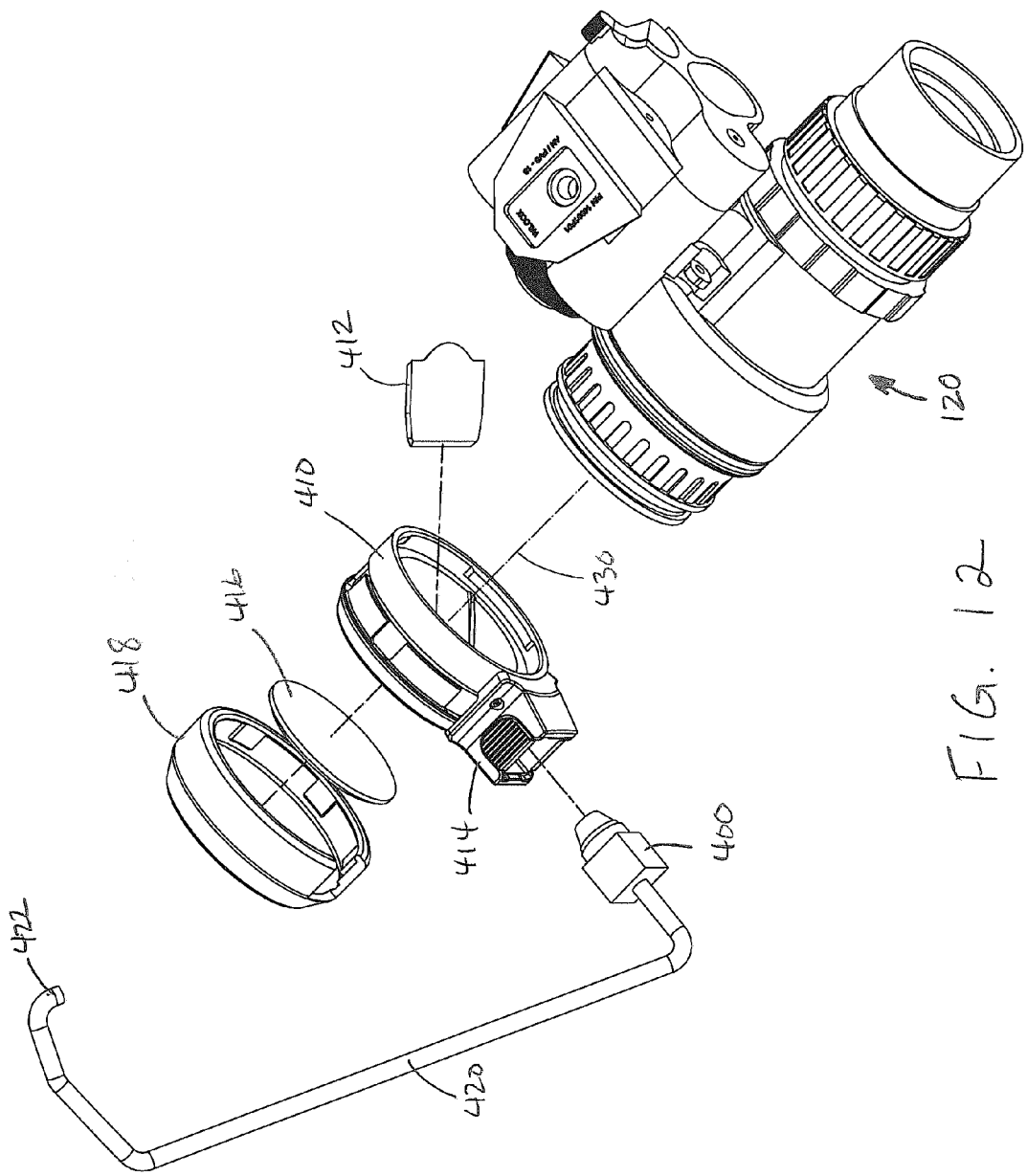

HEAD-MOUNTED VIDEO RECORDING SYSTEM

CROSS-REFERENCE TO RELATED APPLICATIONS

The present application claims the priority benefit under 35 U.S.C. §119(e) of U.S. Provisional Application Ser. No. 60/879,923, filed Jan. 11, 2007. The aforementioned provisional application is incorporated herein by reference in its entirety.

BACKGROUND

The present disclosure relates to a camera system and more particularly to a modular helmet- or head-mounted camera recording system. Although the present disclosure will be shown and described herein primarily by way of reference to the preferred embodiment wherein the video recording system in accordance with this teaching is attached to a head-protective helmet, it will be recognized that the present system is amenable to all manner of hard or soft head mounts, hear wear, head straps, or other head gear.

SUMMARY

A head-mounted video recording system is provided for mounting on a piece of head gear, preferably a head-protective helmet. The system includes a camera module attachable to the head gear, including a first video camera integrated into the camera module for generating a video signal. A recording module is removably attachable to the head gear and is adapted to receive the video signal and store data representative of the video signal. A power supply module is removably attachable to the head gear and is electrically connectable to the camera module and the recording module.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

FIG. 4 is a right side view of the video storage device.

FIG. 5 is an isometric view of the video storage device.

FIG. 6 is a left side view of the video storage device.

FIG. 12 is an exploded view of night time camera eye cup assembly for use with a night vision system.

DETAILED DESCRIPTION OF THE PREFERRED EMBODIMENTS

Figure 1:
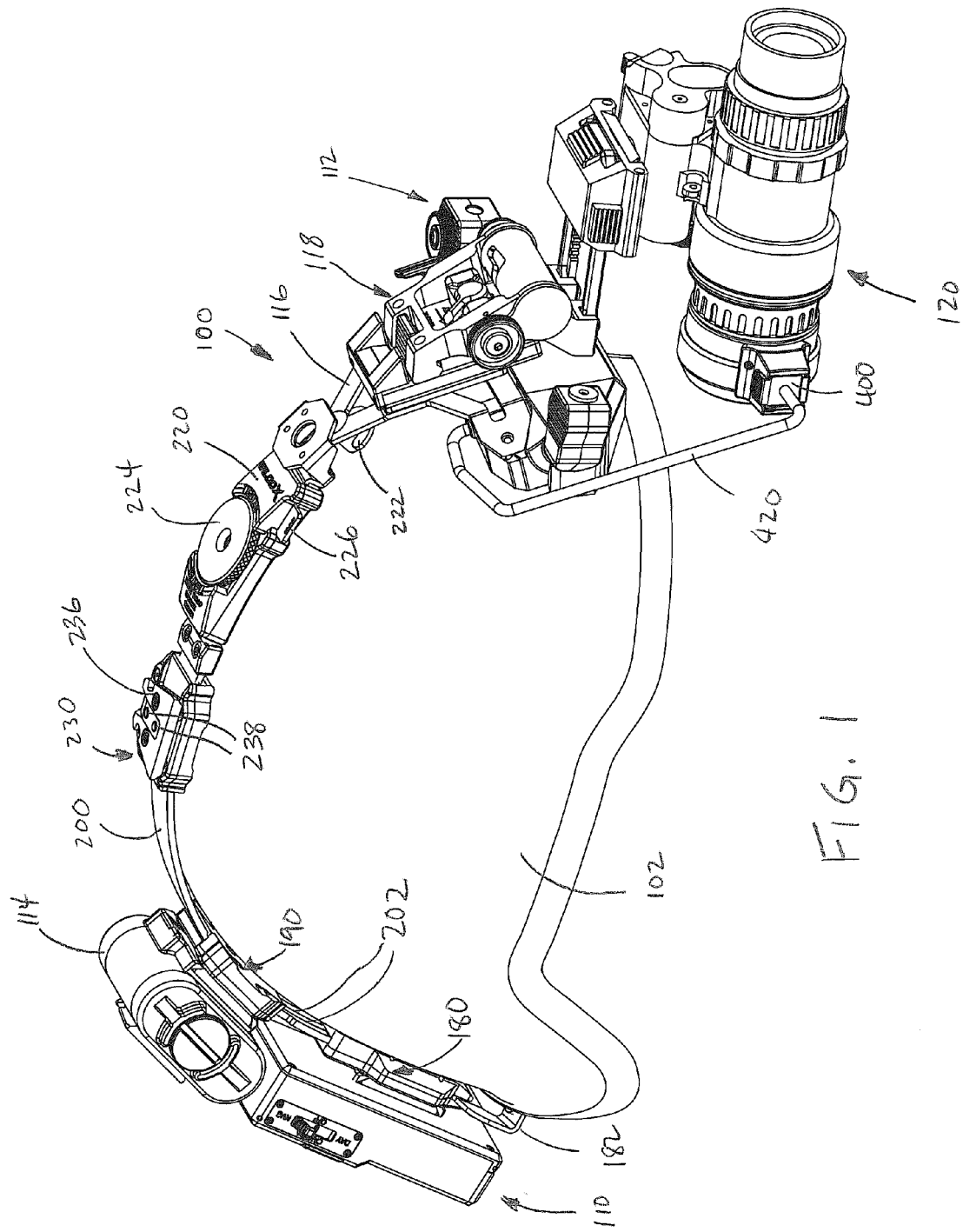
FIG. 1 is an isometric view of an exemplary helmet mounted camera system in accordance with this disclosure, attached to a helmet.
Figure 2:
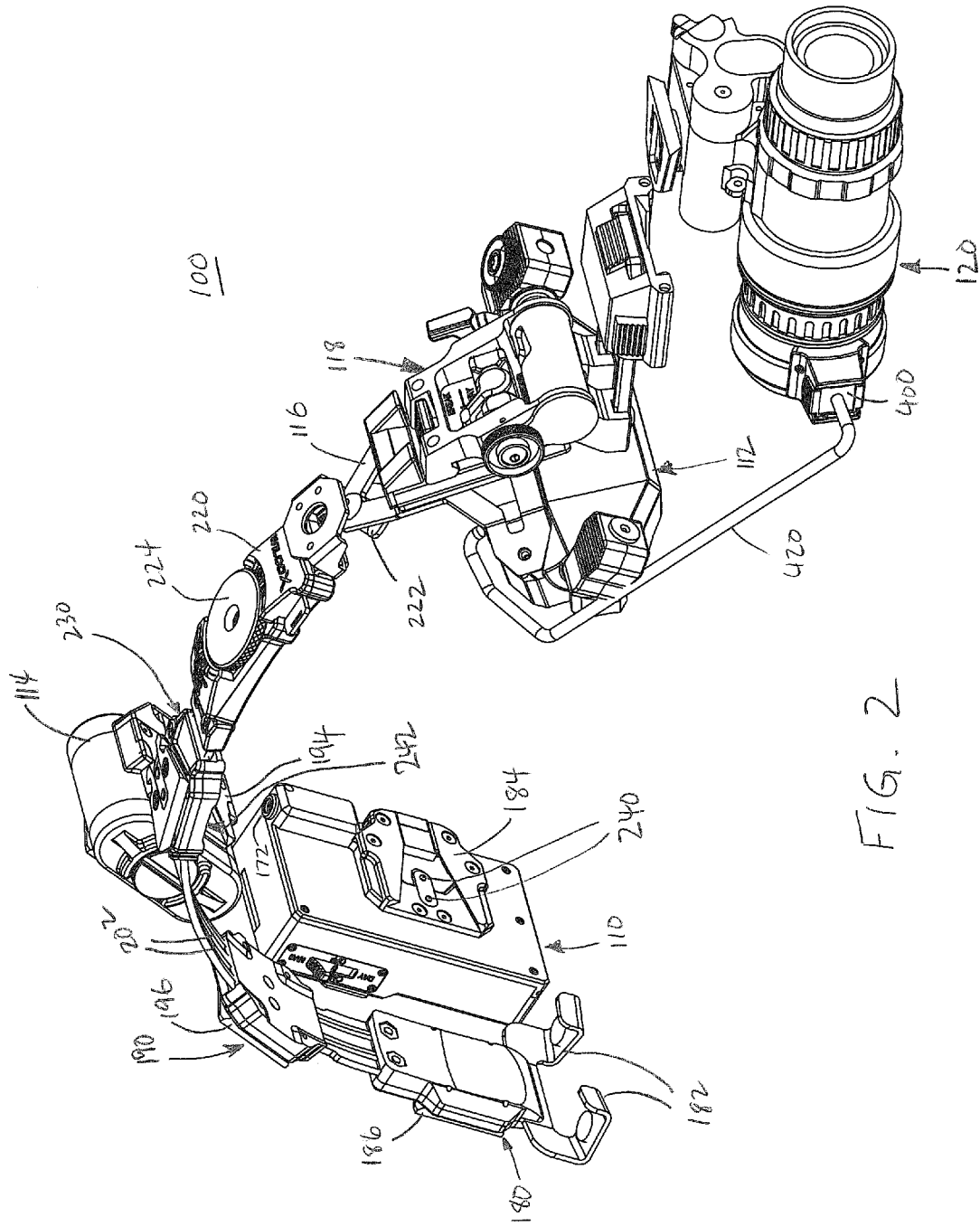
FIG. 2 is an exploded isometric view of the system shown in FIG. 1.
Figure 3:
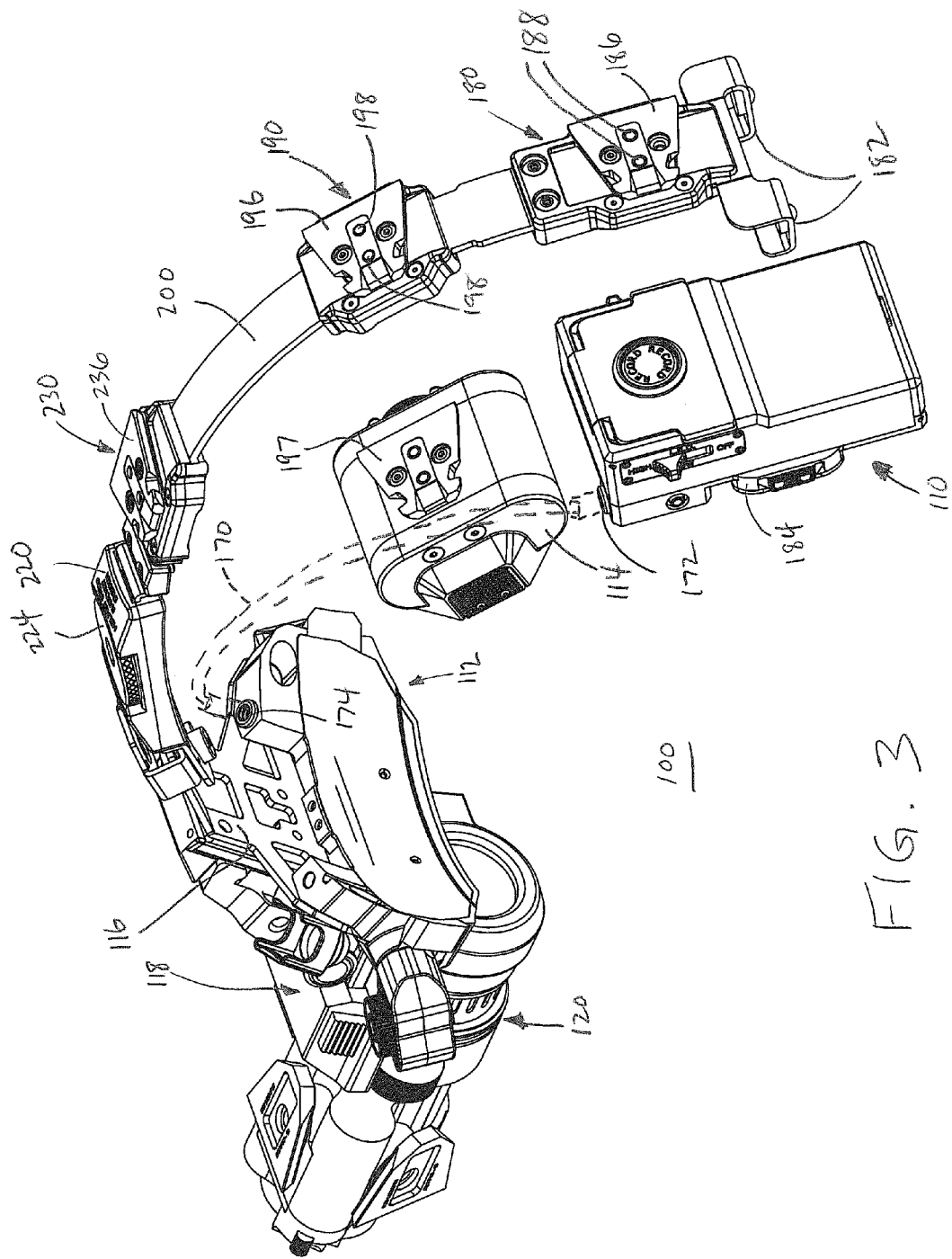
FIG. 3 is an exploded rear isometric view of the system shown in FIG. 2.
Figure 7:
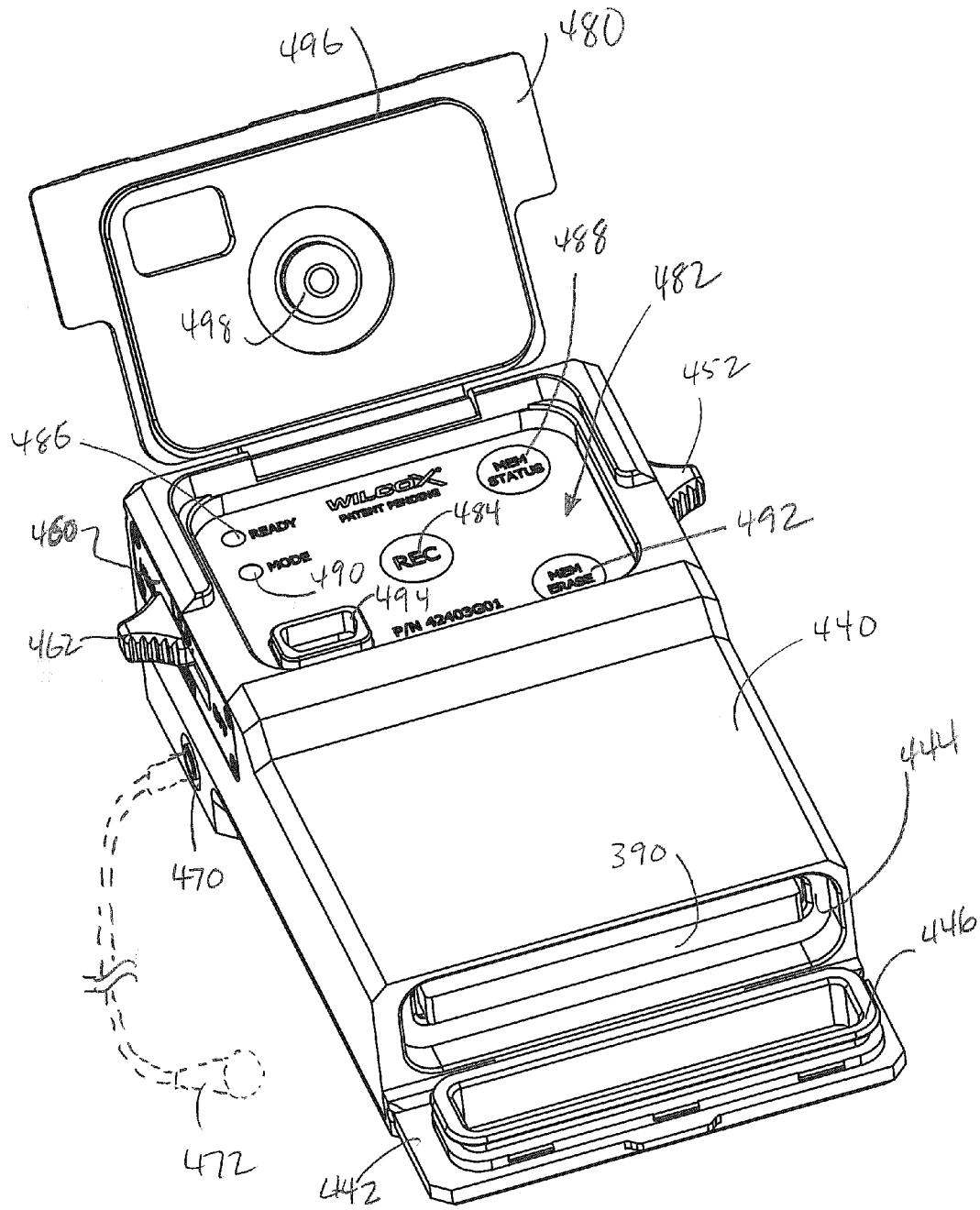
FIG. 7 is an enlarged, isometric view of the video storage device with the control panel cover and memory card slot cover in the open position.
Figure 8:
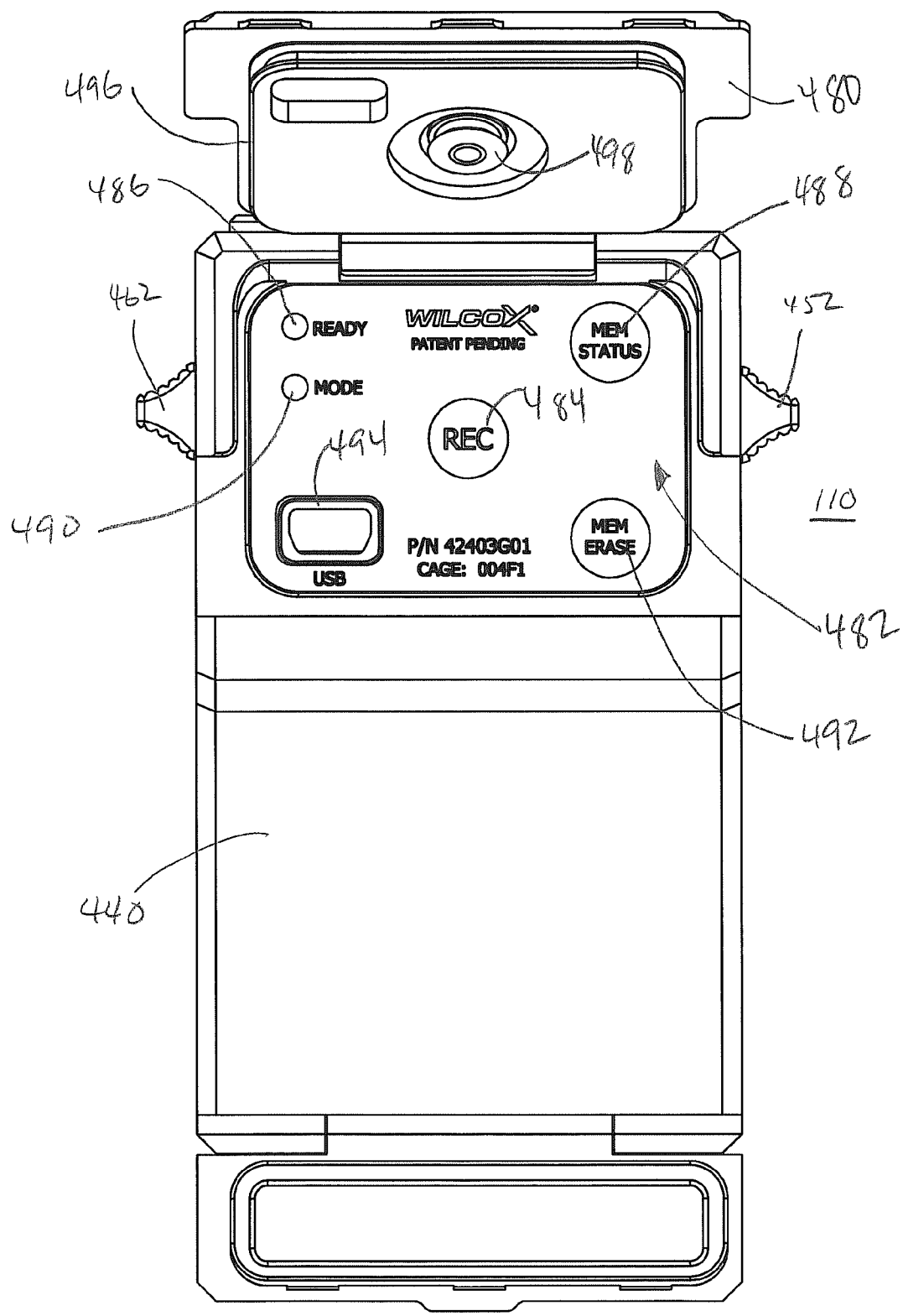
FIG. 8 is an enlarged, rear view of the video storage device with the control panel cover and memory card slot cover in the open position.
Figure 9:
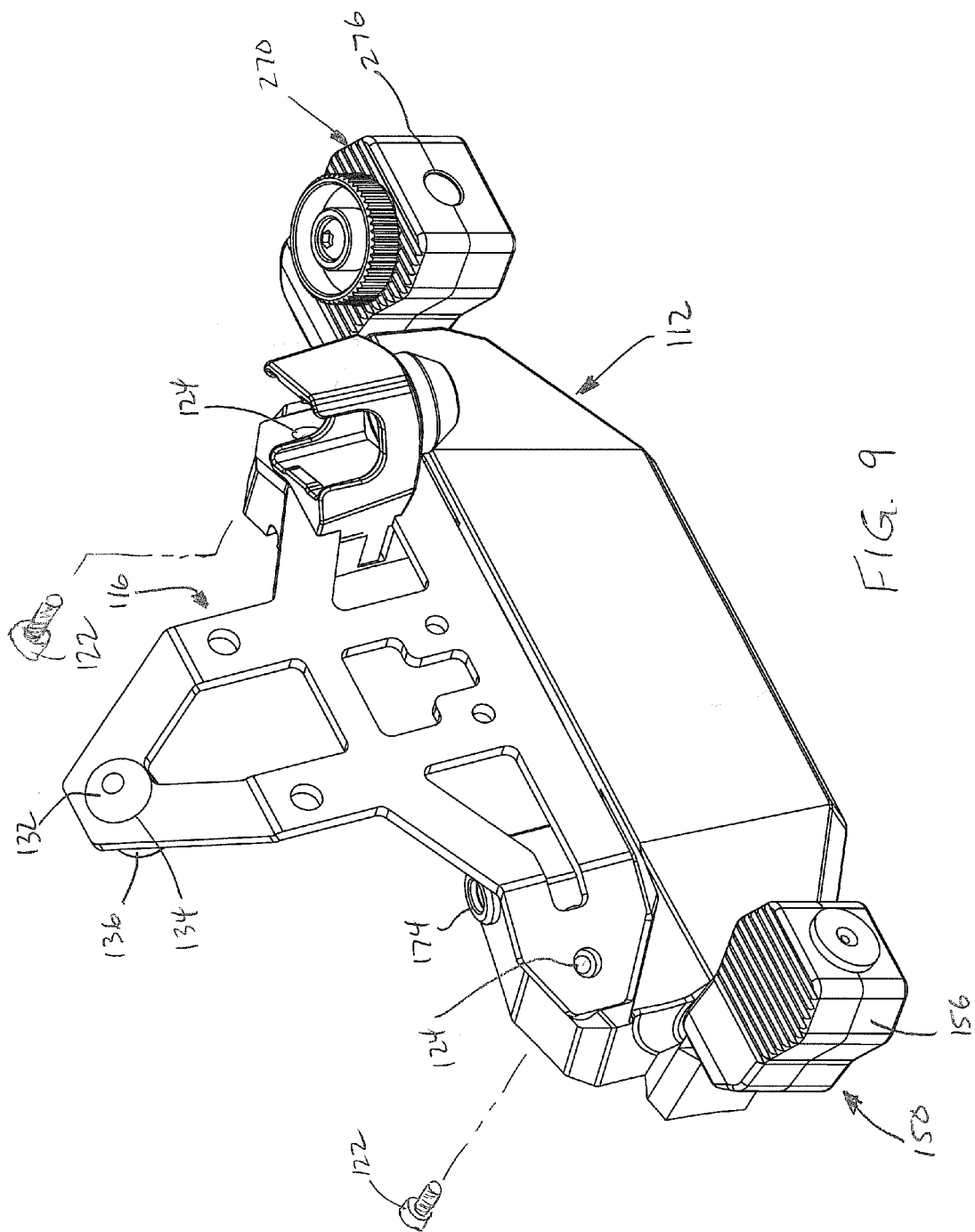
FIG. 9 is an enlarged, isometric view of the helmet interface bracket with camera module.
Figure 10:
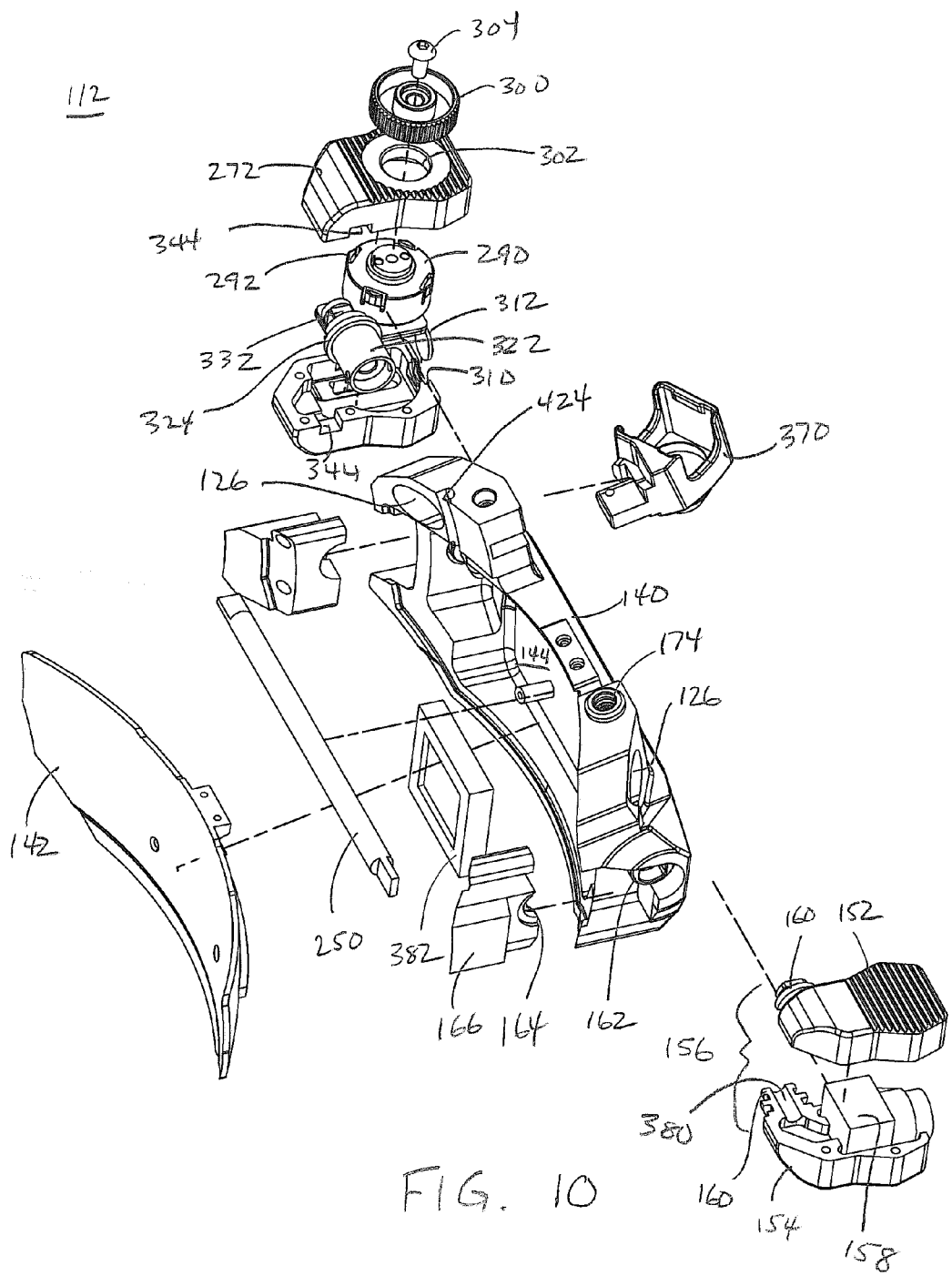
FIGS. 10 and 11 are exploded isometric views of the camera module.
Figure 11:
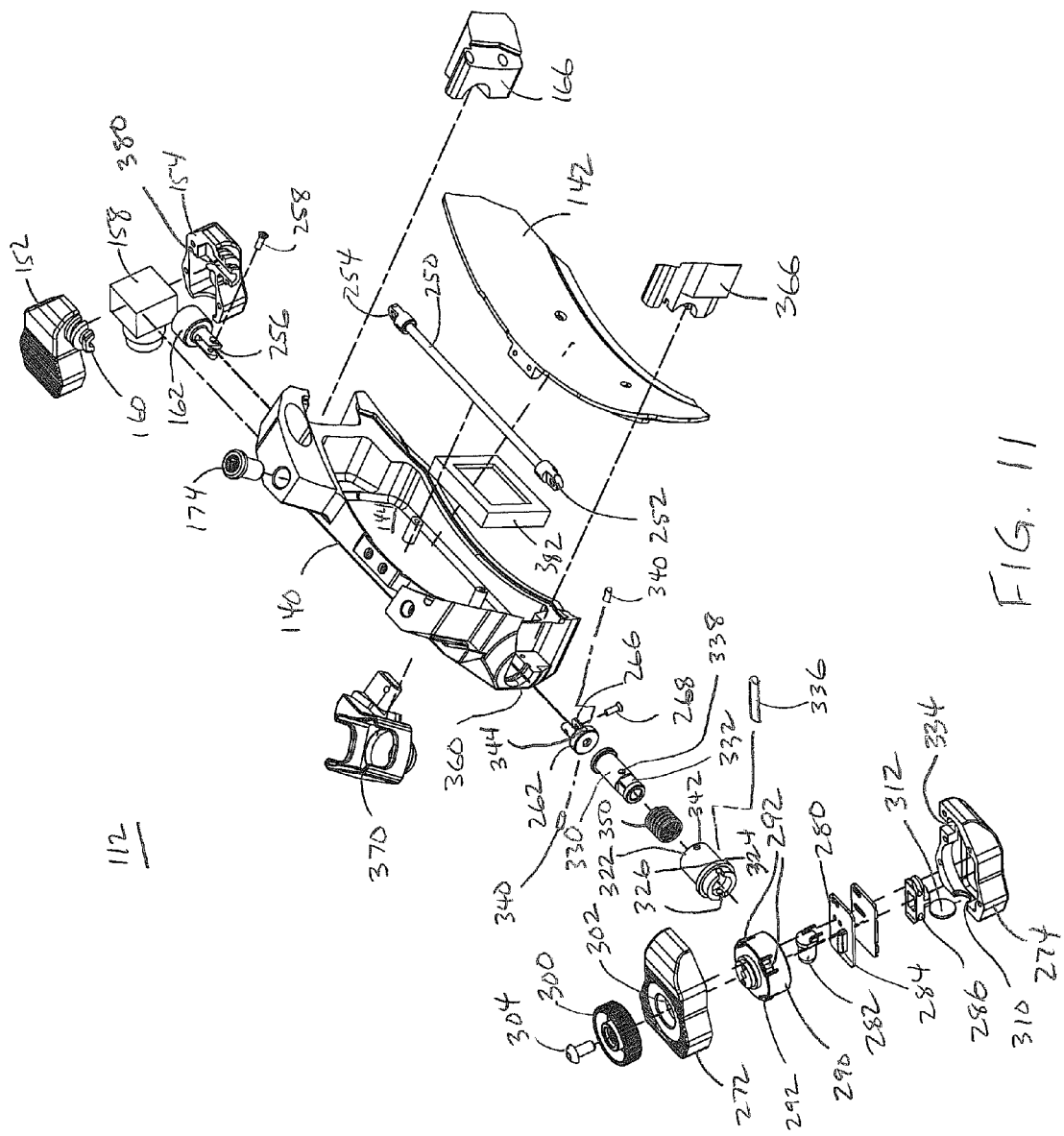

Referring now to the drawing figures, an exemplary modular helmet-mounted camera system 100 is adapted to be attached to a helmet 102, such as a military field helmet or other head-protective helmet, and includes a recording module 110 operably coupled to a camera module 112 and a power supply module 114 for supplying power to the recording module 110 and camera module 112. It will be recognized that the system may be adapted for use with other types of head worn systems, straps, etc. In a preferred alternative embodiment, the system is employed with a padded head strap system, such as the L2 Series NVG Head Mount available from Wilcox Industries Corp. of Newington, N.H.

The recording module 110 is coupled to a first connector 180 having rear hooks 182 for removably engaging the rear portion of the helmet 102 and includes a connecting shoe 184 for removable attachment to a mating foot 186 on the connector 180.

A strap 200 is attached at a first end to the first connector 180 and at a second end to a tensioning member such as a ratchet member 220 having a hook 222 for removable attachment to a helmet mounting bracket 116. The ratchet 220 includes a thumb wheel 224 which is rotatable to increase tension in the strap 200 and a release button 226 for releasing the ratchet 220, e.g., for removal of the strap 200 from the helmet 102. The ratchet mechanism 220 may be as described in U.S. Pat. No. 7,219,370, which is commonly-owned herewith. U.S. Pat. No. 7,219,370 is incorporated herein by reference in its entirety.

The power supply module 114 is coupled to a second connector 190 on the strap 200. In a preferred embodiment, the second connector 190 may be a movable connector, e.g., which may be positioned at a desired location on the strap 200 and secured in position. The second connector 190 includes a foot 196 for removably attaching a mating shoe 194 on the connector 190. In the depicted preferred embodiment, the power supply 114 has a shoe 197 opposite the mounting foot 196 for electronically coupling additional power supply modules 114, e.g., in parallel fashion.

An optional third connector 230 may also be provided and includes a connection foot 236 for connecting to a mating connector shoe of another helmet mounted device, which may be a friend/foe identification unit, GPS antenna, night or day camera, communication device, or other helmet-mounted accessory. In the depicted preferred embodiment, the accessory modules may be attached to any of the connectors 180, 190, and 230 and receive power from an attached battery module 114. Likewise, the battery module 114 may be attached to any of the connectors 180, 190, and 230 to provide power to the other connectors on the strap 200. Thus, the battery module 114 and accessory devices may be attached to any of the connectors 180, 190 and 230 and other arrangements of the attached modules on the system 100 are possible.

Although the depicted preferred embodiment illustrates sliding shoe-type connectors, it will be recognized other types of quick connect/disconnect fasteners providing a removable mechanical and electrical coupling may be employed. For example, in alternative embodiments, the connectors may be bayonet connectors of the type shown and described in the aforementioned commonly-owned U.S. Pat. No. 7,219,370.

The strap 200 includes conductive wires or strips 202, e.g., stainless steel strips although other conductive materials are contemplated. The stainless steel strips may be received in complimentary axially extending grooves molded or otherwise formed in the strap 200 or otherwise embedded in the strap 200. The conductive strips 202 are electrically coupled to electrical contacts 188 on the connector 180, electrical contacts 198 on the connector 190 and contacts 238 on the connector 230. The contacts 188 contact electrical contacts 240 on the shoe portion 184 of the attached recorder device 110. The contacts 198 contact like electrical contacts 242 on the power supply 114 which are in turn electrically coupled to the one or more batteries contained within the power supply 114.

The camera module 112 is adapted to attach to the front of the helmet 102 beneath a helmet mounting bracket 116 having a pivoting interface 118 of a type for positioning an attached optical device 120 such as a night vision system in front of an eye of a user. The interface 118 may be of a type shown in U.S. Pat. No. 7,219,370 or U.S. provisional Application No. 60/982,533 filed Oct. 25, 2007, both of which are commonly-owned herewith and both of which are incorporated herein by reference in their entireties.

Fasteners 122 attach the camera module 112 and bracket 116 to the helmet from the interior of the helmet and pass through openings in the helmet aligned with openings 126 in the camera module 112 and openings 124 in the helmet mount 116 to secure the helmet mount 116 and camera system 112 to the helmet 102. For example, the threaded fasteners may engage threaded nuts (not shown) or the openings 124 may be tapped to provide internal threads. A fastener 132 passes through an opening 134 in the helmet mount 116 and a bushing or spacer 136 is provided, which is roughly the same thickness as the camera module 112.

The camera module 112 includes a front housing shell 140 and a rear plate 142 defining an interior compartment 144. A camera unit 150 includes a day time camera element 158 received within day time camera housing shells 152 and 154 which cooperate to define a day time camera housing 156.

The day time camera housing 156 includes an arm 160 which is keyed to a rotatable tie rod end 162 and rotatably captured within an opening 164 defined by the front housing shell 140 and a tie rod trap insert 166.

A tie rod 250 includes a first end 254 defining a tongue received within a groove 256 on the tie rod end 162 and attached with a fastener 258, such as a pin, threaded fastener or the like. A second end 252 of the tie rod 250 defines a tongue which is received within a groove 266 on a second tie rod end 262 and secured with a fastener 268.

An LED unit 270 includes housing shells 272 and 274 defining a housing 276. A circuit board 280 carries a LED light source 282 and a switch 284. The switch 284 is preferably a magnetic reed switch having a manually actuatable switch actuator 286 on the housing 276 which carries a magnet into and out of proximity of the switch 284 to selectively close and open the switch 284. Alternatively, a contact switch, such as a sliding contact switch, push button contact switch, or the like may be used.

The LED element 282 is received within a rotatable color wheel 290. The color wheel 290 may be formed of a molded material and preferably a molded, transparent material, such as a polycarbonate material such as LEXAN or other transparent polymer material The color wheel 290 is connected to a thumb wheel 300 through an opening 302 in the upper shell 272 via a fastener 304.

The housing 276 defines a lens aperture 310 receiving a lens 312. A plurality of filter elements 292 are angularly spaced about the color wheel 290 periphery. Each filter 292 may be selected to allow a desired color of light to pass through. In a preferred the LED 282 is a white LED. The rotational position of the color wheel 290 may be adjusted to select a desired color of light (e.g., red, green and blue) by rotating the thumb wheel 300 to bring the appropriate filter 292 into alignment with the lens 312 and lens aperture 310. White light may be provided by rotating the color wheel 290 to a position wherein no filter 292 is disposed between the LED 282 and lens 312.

The LED unit 270 includes a keyed end 332 of an inner sleeve 330, which engages a keyway 334 in the housing 276. A pin 336 is received within the grooves 326 on an outer sleeve 322 coaxially receiving the inner sleeve 330 and aligned pin holes 338 in the inner sleeve 330.

The second tie rod end 262 includes the groove 266 receiving the tongue 252 of the tie rod 250 and is fastened therein with the fastener 268. The tie rod end 262 is attached to the outer sleeve 322 via one or more pins or like fasteners 340 passing through one or more openings 342 formed in the outer sleeve 322 and one or more aligned openings 344 in the tie rod end 262. A spring 350 is coaxially received over the inner sleeve 330 and within the outer sleeve 322.

The flange 324 is rotatably received within a grooved opening 360 defined by the front housing shell 140 and a tie rod trap insert 366. In operation, the camera unit 150 and the LED unit 270 will remain in alignment and pivot together about the pivot axis of the tie rod 250, e.g., in response to manual rotation of either the camera unit 150 or the LED unit 270.

If it is desired to rotate the LED unit 270 independently of the camera unit 150, the LED unit 270 may be pulled transversely outwardly to compress the spring 350 and to disengage the pin 330 from the notches 326 formed in the end of the outer sleeve 322. This allows the LED unit 270 to rotate independently of the camera unit 150. For example, it may be advantageous in some instances when recording video with the camera unit 150 to angle the LED unit 270 somewhat upwardly to provide more diffuse lighting of the scene or object being recorded.

A yoke 370 may be provided on the front housing shell 140 to provide for storage of a night time camera unit 400 when the night time camera 400 and/or the night vision goggle 120 are not in use. A multi-conductor cable 170 (shown in broken lines) extends between a connector socket 172 on the recorder device 110 and a connector socket 174 on the front housing shell 140.

Power to operate the day-time camera 150 is provided by the power supply 114 and is transmitted through the mating contacts 242 and 198 of power supply 114 and connector 190, respectively, and through the conductive strips 202 in the strap 200 and through the contacts 188 on the connector 180 and contacts 240 on the recorder device 110.

The contacts 240 on the recorder device 110 are coupled to the electrical power and signal connector 172 on the recorder device 110. The electrical connector 172 is a multi-pin connector for attaching the multi-conductor cable 170 for transmitting power from the power supply 114 to the LED unit 270 and camera modules 150 and 400, as well as for transmitting a video signal from the camera modules 150 and 400 to the recorder box 110. Power from the connector 174 is electrically coupled to the camera element 158 is provided by conductors passing through the interior compartment 144 and through a channel 380 in the housing 156. Likewise, electrical signals from the camera element 158 are carried via conductors passing through the channel 380 in the housing 156 into the interior compartment 144 to a day time camera video circuit board 382, which is coupled to the connector 174.

Video signals from the video circuit board 382 are passed from the circuit board 382 to the recorder unit 110 via the cable 170, wherein the video signal is converted to a digital representation via analog-to-digital conversion circuitry in the recorder unit 110 and stored on an electronic storage medium 390, which is preferably a removable or swappable storage medium such as a flash memory card or other solid-state electronic data storage device.

Alternatively, the video signal may be digitized by an analog-to-digital converter in the camera module 112 and transferred via the cable 170 to the recorder box 110 as digital data for storage on the digital storage medium 390.

The night time or low lux camera 400 is adapted for use with a standard night vision goggle 120 to record video images from the output display of the night vision goggle 120. An adapter ring 410 is adapted to be received over the viewing end of the night vision goggle 120 and carries a beam splitter 412 such as a partially reflective mirror or the like.

The beam splitter 412 is supported in the adapter ring 410 in the optical path of the night vision goggle 120 output display such that a portion of the output image from the night vision goggle 120 is reflected 90 degrees with respect to the optical axis 430 to the low lux camera 400. The camera 400 is removably supported on a camera retainer 414 on the adapter ring 410.

The portion of the output image from the night vision goggle 120 that is not reflected by the beam splitter 412 passes through the beam splitter 412. A lens 416 and a bezel or eyepiece 418 are attached to the adapter ring 410 and the portion of the image transmitted by the beam splitter 412 is viewable through the lens 416. In this manner, the output display of the night vision goggle 120 can be simultaneously recorded as video data and simultaneously viewed by the user.

The video signal from the low lux camera 400 is carried over a cable 420, which has an end 422 that passes through a channel 424 in the front housing shell 140 into the interior compartment 144 of the camera module 112. The cable 420 includes power conductors which are electrically coupled to the power supply 114 and signal conductors which are electrically coupled to the appropriate pins of the connector 174 for transmission over the cable 170 to the recorder box 110. A digital representation of the output display of the night vision goggle 120 may then be recorded and stored on the storage medium 390.

The recorder module 112 includes a housing 440 defining an interior for housing the circuit components thereof. A hinged door 442 is moveable between closed and open positions to provide access to a memory card interface slot 444 receiving the memory card 390. The door 444 may include a sealing member 446 to provide a seal against the entry of moisture or external contaminants. It will be recognized that other forms of electronic storage media may be employed, such as a hard disk drive or other magnetic storage medium, optical or magneto-optical storage media, or other nonvolatile storage media.

A camera switch 450 is provided on the housing 440 for switching between the day time camera 150 and the low lux camera 400 and for powering off both of the cameras. The switch 450 preferably employs reed switches disposed within the housing 440 and in electrical communication with the cameras and power supply 114 and which are actuated by a magnet carried on a sliding switch actuator 452 for the selective opening or closing of the internal reed switches. In this manner, entry of water or external contaminants through the switch 450 is prevented. It will be recognized that other switch types, such as contact switches are also contemplated.

An LED switch 460 is provided on the housing 440 for selectively toggling the LED unit 270 between high, low, and off states. The switch 460 preferably employs internally housed magnetic reed switches which are actuated by selective positioning of a magnet carried on a sliding actuator 462, although other switch types are contemplated.

A microphone input jack 470 may also be provided for attaching a microphone 472 (shown in broken lines) for recording an audio signal from the microphone 472 as digital audio data associated with the recorded video data. The microphone 472 may advantageously be mounted on the user's helmet 102 or otherwise be attached to the user.

A control panel door 480 is movable between a closed position and an open position to provide access to a control panel 482. The control panel 482 includes a record button 484 which is pressed to begin recording video from the selected camera 150 or 270, depending on the position of the switch 450, as well as associated audio from the microphone 472 attached to the audio input jack 470. Pressing the record button 484 again stops the recording operation. A vibrator mechanism may optionally be provided in the recording module 110 to provide tactile feedback when a recording operation is started or stopped.

A ready light 486, such as one or more LEDs, may be provided to provide an indication of when the unit 110 is ready to begin a recording operation. For example, a red LED may be provided to indicate that the unit 110 is not ready to record and a green LED may be provided to indicate that the unit 110 is ready to record.

A memory status button 488 is depressible to output an indication of the memory status, such as the amount of memory remaining on the memory card 390. The memory status output may be provided via a mode light 490, for example, wherein a sequence of light flashes may be output, which sequence varies in accordance with the memory status. A memory erase button 492 may be provided to erase the contents of the memory card 390 or to make the card available for overwriting.

A USB port 494 is provided for interfacing the recorder module 110 with a computer or computer-based information handling system, e.g., for viewing, storing, uploading, or archiving the contents of the memory card 390. Alternatively, the memory card 390 may be interfaced to a computer or computer-based information handling system by removing the card 390 from the card slot 444 of the recorder 110 and inserting the card 390 into an appropriate card reader or card slot interface of the computer or computer-based information handling system.

It will be recognized that the depicted USB connection port 494 is exemplary only and that alternative or additional communication means may be provided for accessing or transferring the data from the memory card 390, including a cabled connection such as an IEEE 1394 (Firewire) interface or other serial or parallel data connection, or a wireless link, such as a radio frequency (RF) or optical (e.g., infrared) communication link.

The control panel door 480 may include a sealing member 496 for providing a seal against external contamination. A pass-through button 498 may be provided on the door 480 for actuating the record button 484 without the need to open the control panel door 480. Additional means for controlling the record function, such as a tethered hand held remote may also be provided.

The invention has been described with reference to the preferred embodiments. Modifications and alterations will occur to others upon reading and understanding the preceding detailed description. It is intended that the invention be construed as encompassing all such modifications and alterations insofar as they come within the scope of the appended claims or the equivalents thereof.

Having thus described the preferred embodiments, the invention is now claimed to be:

1. A head-worn video recording system for mounting on a piece of head gear, comprising:
    a recording module removably attachable to the head gear and adapted to receive the video signal and store data representative of the video signal;
    a camera module attachable to the head gear, including a first video camera integrated into the camera module for generating a video signal;
    a power supply module removably attachable to the head gear and electrically connectable to said camera module and to said recording module; and
    a light module integrated with said camera module and electrically coupled to said power supply module, wherein said first camera module and said light module are each pivotable about a common pivot axis which extends transversely with respect to an optical axis of said first video camera.

2. The system of claim 1, further comprising:
    a transversely extending tie rod coupled to said first video camera and said light module, wherein pivoting rotation of one of said first video camera and said light module causes pivoting rotation of the other.

3. The system of claim 2, further comprising:
    said light module is adapted to be selectively decoupled from said tie rod wherein when said light module is decoupled from said tie rod, each of said camera module and said light module can pivot about the pivot axis independently of the other.

4. The system of claim 1, further comprising either or both of:
    said first camera module and said light module pivotable about said common pivot axis so that said first camera will image a scene, subject, or object within a line of sight of a user donning the head gear and an optical path of said light module will extend in a direction generally parallel to the line of sight of the user donning the head gear; and
    said first video camera having an optical axis which is substantially parallel to an optical path of said light module for illumination of a scene, subject or object to be imaged.

* * * * *